Aug. 25, 1964  F. G. LANGENBERG  3,145,853
AIR BRACE
Filed Dec. 7, 1961
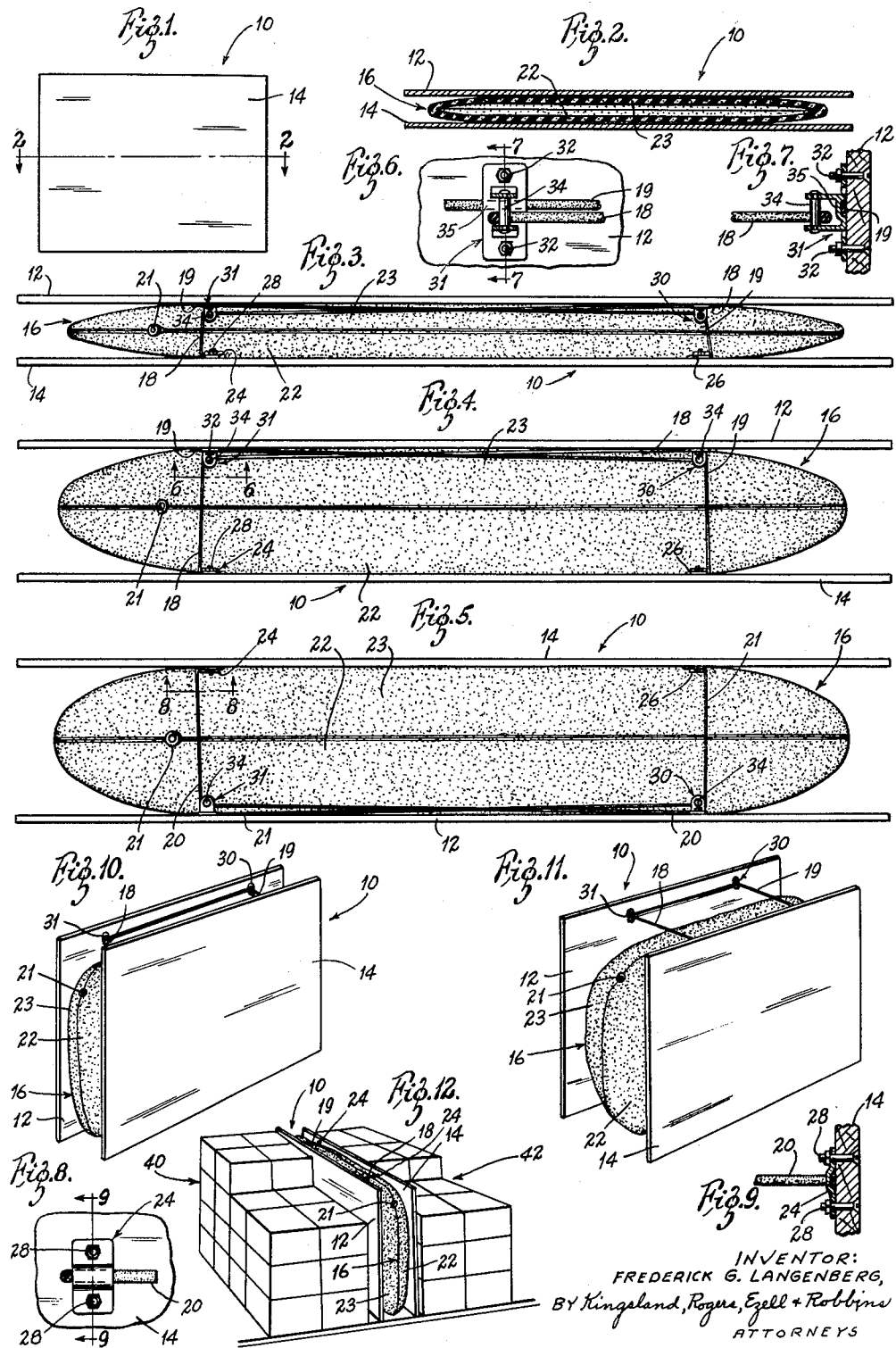
INVENTOR:
FREDERICK G. LANGENBERG,
BY Kingsland, Rogers, Ezell & Robbins
ATTORNEYS

United States Patent Office 3,145,853
Patented Aug. 25, 1964

3,145,853
AIR BRACE
Frederick G. Langenberg, 6608 Pershing, St. Louis, Mo.
Filed Dec. 7, 1961, Ser. No. 157,635
2 Claims. (Cl. 214—10.5)

This invention relates to an air brace or a dunnage device used in the shipping industry.

In particular, this invention relates to an air brace having an inflatable dunnage or air bag connected at its sides to a pair of movable platens and having a resilient and elastic cord means connecting the platens to control them in guided relationship. The construction of the air brace or dunnage device for this invention obviates complicated structure to insure the parallel alignment of the movable platen and retention of the air bag between platens when expanded and retracted.

Essentially this invention embodies an air brace or dunnage device utilizing an inflatable rubber bag which is connected by adhesive or other means at its sides to a pair of rigid platens. The platens are in turn connected to one another by elastic cords so that in the deflated condition the platens are held tightly against one another by the cords and can be handled as a unit. The cords, of which there are a separate pair at the top and bottom of the platens, are connected to the platens by having one end affixed to one of the platens and pass over a guide bracket intermediate of their ends and are then connected to the opposite platen. This feature of the elastic cords and the connection of the sides of the bag to the platens insures a parallel alignment of the platens and retraction in the deflated condition to a compact unit.

By means of this invention the air brace can be very simply positioned between tiers of crates or the like and expanded by relatively unskilled personnel to take up space between the tiers and prevent movement of the crates while in transit. The air brace can be handled by relatively unskilled workmen in a minimum of time and are rugged and relatively inexpensive in cost.

The above features are objects of this invention and further objects will appear in the detailed description which follows and will be otherwise apparent to those skilled in the art.

For the purpose of illustration there is shown in the accompanying drawings a preferred embodiment of this invention. It is to be understood that these drawings are for the purpose of example only and that the invention is not limited thereto.

In the drawings:

FIGURE 1 is a view in front elevation of the air brace;

FIGURE 2 is an enlarged view in section taken on the line 2—2 in FIGURE 1;

FIGURE 3 is an enlarged top plan view of the air brace;

FIGURE 4 is a top plan view of the air brace showing it in partially expanded condition;

FIGURE 5 is a bottom plan view of the air brace showing it in a further expanded condition;

FIGURE 6 is an enlarged view in section taken on line 6—6 on FIGURE 4 showing a guide bracket for the elastic cords;

FIGURE 7 is a view in section taken on the line 7—7 of FIGURE 6;

FIGURE 8 is an enlarged view in section taken on line 8—8 of FIGURE 5 showing an anchoring bracket for the elastic cord;

FIGURE 9 is a view in section taken on line 9—9 of FIGURE 8;

FIGURE 10 is a pictorial view of the air brace in substantially deflated condition;

FIGURE 11 is a view taken similarly to FIGURE 10, but showing the air brace in expanded condtion; and FIGURE 12 is a pictorial view showing the air brace in operative condition between two tiers of crates.

The air brace is generally indicated in the drawings by the reference numeral 10. As shown in FIGURES 1, 2, 3, 4 and 5, it is comprised of a pair of rectangular platens 12 and 14, an inflatable dunnage bag 16, and top elastic cords 18 and 19 and bottom elastic cords 20 and 21 connecting the platens together in biased condition.

The inflatable dunnage or air bag 16 is provided with an air valve 21 in order that it may be inflated in the usual fashion. The dunnage bag in the collapsed condition has a pair of substantially flat sides 22 and 23 as shown in the construction of FIGURE 3. The bag is connected by adhesive or other means of affixation to the platens throughout a major proportion of its length, as shown in FIGURE 2.

The top cord 18 is connected to the platen 14 by anchoring bracket 24 and guide bracket 30. The anchoring bracket 24 is best shown in FIGURE 8 and is bolted to the platen by means of screws 28 or the like so as to anchor the cord firmly.

The top cord 18 is biasedly connected to the platen 12 by means of guide brackets 30 and 31. These brackets are best shown in detail in FIGURES 6 and 7 where it will be seen that they are bolted to the platen 12 by means of bolts 32. The brackets contain a guide shaft 34 spaced from the base of the guide bracket and the top cord 18 passes around the shaft of the bracket 31 in the fashion shown so as to biasedly connect the platens 12 and 14 and draw them together. The end of the cord 18 is anchored to the platen 12 by being clamped between a clamp portion 35 of the bracket and the platen. The top cord 19 is connected in similar fashion to the platens 12 and 14, but has one end anchored to platen 14 by anchor bracket 26, while its opposite end is anchored to platen 12 by guide bracket 31 while it is guided upon platen 12 at an intermediate section by a guide bracket 30.

The bottom cords 20 and 21 are connected to the platens in the same fashion as described for the top cords 18 and 19 and it will be apparent that the anchoring brackets and the guide brackets employed at the top and bottom are identical in construction.

*Use*

The air brace is shown in the deflated condition in FIGURES 3 and 10. As there shown, the air has been evacuated from the dunnage bag and the two platens are drawn tightly together by the biasing action of the top and bottom elastic cords. It will be apparent that as the dunnage bag is inflated by pumping air through the valve 21 the bag expands. This condition is shown in FIGURE 11 where it will be seen that by the action of the top and bottom elastic cords the platens are controlled, which control is further facilitated by the adhesive connection of the sides of the bag to the platens. This construction insures that the platens move together in substantially a parallel relationship when the bag is inflated.

The air brace is shown in actual use in FIGURE 12. In the operation it will be understood that the air brace in the deflated condition shown in FIGURE 10 is placed between tiers of crates indicated by the reference numerals 40 and 42 in the space provided between them. When properly emplaced, the dunnage bag is inflated to the condition shown in FIGURE 12. This inflation is continued to the point where the platens are caused to expand away from one another into engagement with the sides of the tiers 40 and 42. Subsequently the inflation is continued to a point where the air brace is expanded tightly and firmly against the sides of the tiers so that movement of the platens toward one another is resisted by the internal pressure built up within the dunnage bag.

The air brace so provided by this invention can be very simply operated and set up in a matter of seconds. When inflated, the platens are caused to move in substantially parallel relationship because of the connection of the elastic cords and the affixation of the sides of the dunnage bag to the platens. When deflated the platens are returned in biased relationship tightly against one another by the action of the elastic cords and also through the affixation of the sides of the dunnage bag to the platens. Thus, when deflated, the air brace can be handled very simply as a unit and stacked together with other air braces or conveniently stored as a compact device.

Various changes and modifications may be made within this invention as will be readily apparent to those skilled in the art. Such changes and modifications are within the scope and teaching of this invention as defined by the claims appended hereto.

What is claimed is:

1. An air brace comprising a pair of rectangular rigid platens spaced from one another and secured on opposed sides to an inflatable air bag positioned between said platens, said air bag having a pair of opposed substantially flat sides when deflated and said sides being secured to said platen throughout a major portion thereof to facilitate parallel alignment of the platens upon inflation and deflation, elastic means comprising an elastic cord means connecting the platens together, said elastic cord means comprising a pair of elastic cords at the top and bottom of the platens, each of said cord pairs constituting a first elastic cord anchored at one end on one of said platens and passing through guide means and around a guide shaft on the opposed platen and anchored to its other end thereon, a second cord anchored at its opposed ends to said platens in reverse fashion, said elastic cords thereby biasing the platens toward one another.

2. An air brace comprising a pair of rectangular rigid platens spaced from one another and secured on opposed sides to an inflatable air bag positioned between said platens, said air bag having a pair of opposed substantially flat sides when deflated and said sides being secured to said platen throughout a major portion thereof to facilitate parallel alignment of the platens upon inflation and deflation, said platens being secured to the sides of the air bag by an adhesive and elastic means biasing the platens together and further facilitating the parallel alignment of said platens, said elastic means comprising an elastic cord means connecting the platens together, said elastic cord means comprising a pair of elastic cords at the top and bottom of the platens, each of said cord pairs constituting a first elastic cord anchored at one end of one of said platens and passing through guide means and around a guide shaft on the opposed platen and anchored at its other end thereon, a second cord anchored at its opposed ends to said platens in reverse fashion, said elastic cords thereby biasing the platens toward one another.

References Cited in the file of this patent
UNITED STATES PATENTS

| Number | Name | Date |
|---|---|---|
| 555,111 | Norrington | Feb. 25, 1896 |
| 1,167,719 | Saulmon | Jan. 11, 1916 |
| 1,920,864 | Jacobsen | Aug. 1, 1933 |
| 2,774,503 | Moore | Dec. 18, 1956 |
| 3,028,981 | Ford | Apr. 10, 1962 |